United States Patent [19]

Weaver et al.

[11] 4,256,777

[45] Mar. 17, 1981

[54] METHOD FOR MAKING FRIED POTATO PIECES HAVING THE PEEL RETAINED THEREON

[75] Inventors: William D. Weaver, Collinsville; Warren J. Simon, Idaho Falls, both of Id.

[73] Assignee: Ampco Foods Inc., San Francisco, Calif.

[21] Appl. No.: 30,883

[22] Filed: Apr. 17, 1979

[51] Int. Cl.³ ............................................. A23L 1/216
[52] U.S. Cl. .................... 426/637; 426/393; 426/438; 426/441; 426/444; 426/464; 426/518
[58] Field of Search ............... 426/637, 438, 441, 444, 426/445, 456, 464, 506, 509, 510, 518, 524, 808, 393, 410; 99/537, 538; 83/425.3, 858

[56] References Cited

U.S. PATENT DOCUMENTS

| | | |
|---|---|---|
| 2,056,884 | 6/1934 | Brunstetter . |
| 3,085,020 | 4/1963 | Backinger et al. ............... 426/438 X |
| 3,109,468 | 11/1963 | Lamb et al. |
| 3,175,914 | 3/1965 | Vahlsing . |
| 3,220,857 | 11/1965 | Hollis et al. .......................... 426/637 |
| 3,355,299 | 11/1967 | McLaughlin et al. |
| 3,397,993 | 8/1968 | Strong . |
| 3,597,239 | 8/1971 | Vahlsing .......................... 426/441 X |
| 3,649,305 | 3/1972 | Wilder . |
| 4,031,253 | 6/1977 | Suortti et al. ..................... 426/637 X |
| 4,169,166 | 9/1979 | Hiett et al. ........................... 426/637 |

FOREIGN PATENT DOCUMENTS 900266  5/1972  Canada .
408368  4/1934  United Kingdom .

*Primary Examiner*—Arthur L. Corbin
*Attorney, Agent, or Firm*—Sandler & Greenblum

[57] ABSTRACT

An unpeeled potato is cut into wedge-shaped pieces having a substantially triangular cross-section, the base of which is a section of the exterior surface of said potato having the peel retained thereon and the sides of which have no peel thereon. The pieces are then cooked, parfried, frozen and packaged.

16 Claims, No Drawings

METHOD FOR MAKING FRIED POTATO PIECES HAVING THE PEEL RETAINED THEREON

BACKGROUND

1. Field of the Invention

The invention relates generally to a method for producing a unique shaped fried potato piece. Characteristic of this fried potato piece is that the peel is retained on the surface of its base side substantially in its entirety. The shape of the finish-fried potato piece of the instant invention does not become distorted by substantial ballooning of its sides.

2. Description of the Prior Art

Although french fries may have various sizes and shapes, they are traditionally prepared by cutting a potato lengthwise into slices having a substantially rectangular cross section. U.S. Pat. No. 3,109,468 discloses a method and apparatus for cutting french fry slices from the central portion of the potato to obtain more uniform sizes and shapes and diverting the less desirable outside slab portions to other uses in a manner by which damage to the cellular structure of the potato is reduced. Subsequent to cutting, potato slices are processed into french fries using various treatments as disclosed, for example, in U.S. Pat. Nos. 3,649,305, 3,397,993, 3,355,299 and 3,175,914; and Canadian Pat. No. 900,266. U.S. Pat. No. 2,056,884 and British Pat. No. 408,368 disclose frying thin crisp potato chips made from unpeeled potatoes.

SUMMARY OF THE INVENTION

A method for producing fried potato products has been discovered which utilizes substantially all of the potato without any need for discarding or diverting for other uses the previously considered undesirable exterior portions. The method comprises cutting the potato longitudinally into pieces one side of which is a segment of the exterior surface of the potato. Using this method of cutting enables the practioner of this invention to divide an unpeeled potato into pieces each of which retains the peel on the exterior portion of its base side. The potato pieces having the peel on one side may then be processed by a method comprising parfrying and freezing to produce a potato product which is prepared for consumption by finish frying. Surprisingly it has been discovered that ballooning of the cut sides of frozen potato pieces when finish fried is significantly inhibited when the surface of one side of the piece is substantially covered by the natural potato peel.

It is an object of this invention to produce frozen, fried potato pieces the base side of which is a segment of the exterior surface of the potato having the peel retained thereon.

It is a further object of the instant invention to produce potato pieces the cut sides of which do not become distorted by ballooning when finish fried.

DESCRIPTION OF THE PREFERRED EMBODIMENTS

In attempting to minimize waste and simplify the processing of frozen french fried potatoes, peeled potatoes were cut into longitudinal wedge-shaped pieces prior to subsequent processing comprising parfrying and freezing. This procedure obviates the segregating and waste problems associated with conventional prior art processes which make french fry slices from the central interior portion of the potato and discard the exterior undersized slivers and piece portions. Parfried, frozen and peeled wedge-shaped potato sections when finish fried in preparation for consumption, however, become distorted due to a puffing out or ballooning of substantially the entire length of their cut sides. Although a minor amount of puffing which effects a slight and irregular bubbling or blistering of the surface of fried potatoes is common, ballooning of substantially the entire sides of a fried potato which distorts its intended shape is considered unacceptable.

It has now been discovered that this objectionable phenomenon of ballooning is unexpectedly substantially inhibited when the whole unpeeled potato is cut into pieces each of which retains the peel on the exterior portion of its base side substantially in its entirety during subsequent processing and frying. This discovery is furthermore surprising since it has been found that when potatoes are prepared for consumption by being cut into either peeled or unpeeled pieces and fried without otherwise being processed, such pieces do not exhibit a significant tendency to balloon. Additional advantages of the instant invention include the production of a potato product which has an increased nutritional value and a reduced calorie content as compared to a peeled french fry of the same weight. The process of the instant invention also produces less waste products such as peelings and undersized exterior portions which must otherwise be disposed of or discarded. In addition, the potato product of the present invention has a more flavorful, true potato taste and texture resembling that of a freshly baked potato than conventional french fires which tend to be somewhat bland and oily tasting.

In the production of the frozen, fried potato pieces of the present invention having the peel exterior retained on one side, potatoes are washed and then divided into said pieces prior to preferably precooking, cooling and cooking preliminary to parfrying and freezing. The product may be fried directly from the frozen state by immersion in a deep fat fryer. Intermediate the cooking and parfrying steps said pieces may be immersed in a sugar solution and dried to remove surface moisture.

The potato pieces of the instant invention may be cut by hand or preferably by being forced against and past the sharp edges of a cutter assembly the arrangement of which is such that the potato is cut along its longitudinal axis into wedge-shaped pieces having a substantially triangular cross section the base of which is a section of the exterior surface of the potato and the sides of which extend from the apex which is from substantially the center of the potato. In order to effect such sectioning of the potato, the cutting surfaces of the blades are preferably radially arranged in a single plane relative to the axial path of the potato through said arrangement or in a plurality of parallel planes along said path. Although potatoes of any convenient size may be used, potatoes having a major diameter of between about $1\frac{1}{2}$-$2\frac{1}{2}$ inches and preferably between about $1\frac{3}{4}$-$2\frac{1}{4}$ inches are better suited for the process of the instant invention. The potato, particularly the Russet Burbank, is longer than it is wide and thinner in one width section than another. By major diameter we mean the larger of the two cross sectional width sections. The number of segments into which the potato should be divided is related to the size of the potato. It has been found that potatoes having a major diameter of less than about 2 inches may be divided into about 4-9 cuts and preferably into about 6-9 cuts while potatoes having a major diameter larger than about 2 inches should be divided into preferably 10 segments or more. This relationship of the number of segments to potato size is believed to have an effect in minimizing ballooning of the finish fried product. For example, where an unpeeled potato is divided longitudinally into more than about 12 wedge-shaped pieces, there is a noticeable tendency of the finish fried potato pieces to balloon to an unacceptable extent. In this regard, where the cross section of an unpeeled cut piece is taken transversely from about its midpoint or along what would correspond to the equator of the whole potato, where P is the maximum width of the unpeeled surface side at said cross section, and where C is the sum of the widths of the cut sides not having peel thereon at said cross section, pieces having a C/P ratio of less than about 3.5 and preferably less than about 3.33 have been found not to balloon in objectionable amounts of greater than about 25 percent by weight of total finish fried pieces.

The potato pieces of the instant invention may then be precooked in steam or preferably water at a temperature of about 150° F.–210° F. for about 5–20 minutes and preferably for about 170° F.–190° F. for about 6–10 minutes, cooled in water having a temperature of about 35° F.–100° F., but preferably in cold tap water at a temperature of about 55° F.–65° F., for about 5–20 minutes, and cooked in steam or preferably water at a temperature of about 150° F.–210° F. for about 5–20 minutes and preferably at about 170° F.–190° F. for about 8–12 minutes for a total cooking time of up to 40 minutes, preliminary to parfrying at above about 325° F. but below the smoke point of the fat or oil used for about 35–150 seconds and preferably at 350° F.–370° F. for 50–60 seconds, freezing at below about –10° F. and then packaged. Intermediate cooking and parfrying said pieces may be immersed in a sugar solution and then preferably dried to remove surface moisture. The pieces may be immersed in a solution at a temperature of about 150° F.–175° F. for about 2–3 minutes and dried in hot air at a temperature of about 150° F.–250° F. for about 5–15 minutes. The potato pieces of the instant invention may be prepared for consumption in an oven but preferably by being finish fried directly from the frozen state by deep fat frying at temperatures above 325° F. and preferably within the range of 350° F.–370° F. for about 1½–4 minutes.

EXAMPLE I

Idaho Russet Burbank potatoes having a major diameter of about 2 inches were washed and cut longitudinally into eight substantially equal size unpeeled wedge-shaped pieces having a substantially triangular cross section. These pieces were then precooked in water at a temperature of about 180° F. –185° F. for about 7 minutes, cooled in running tap water having a temperature of about 50° F. for about 6 minutes and cooked in water at a temperature of about 180° F.–185° F. for about 9 minutes. The cooked pieces were immersed in a solution of dextrose at a temperature of about 160° F.–165° F. for about 2½ minutes and subjected to circulating air at a temperature of about 180° F.–200° F. for about 7 minutes. After the above disclosed preliminary preparation, these unpeeled wedge-shaped potato pieces were parfried at a temperature of about 365° F. for about 1 minute, drained and frozen. When finish fried at about 360° F. for about 3 minutes only about 16 percent by weight of these wedge-shaped pieces having the peel on one surface ballooned.

EXAMPLE II

Parfried and frozen peeled potato pieces having a substantially triangular cross section were made following the procedure as set forth in Example I except that each potato having a major diameter of about 2 inches was peeled before being cut into 8 pieces. When finish fried as above, about 60 percent by weight of these peeled wedge-shaped pieces ballooned.

EXAMPLE III

Unpeeled potatoes having a major diameter of about 2 inches were cut into 12 pieces and otherwise processed as in Example I. After finish frying as above, about 53 percent by weight of these wedge-shaped pieces having the peel on one surface ballooned.

EXAMPLE IV

Idaho Russet Burbank potatoes having a major diameter of about 2 inches were separated into two batches. Potatoes from one batch were peeled whereas potatoes from the other batch were not peeled prior to being cut longitudinally into 8 substantially equal size pieces having a substantially triangular cross section. The potato pieces having the peel retained on the surface of one side and the peeled potato pieces were then fried directly without further processing using identical parameters at about 350° F. for up to 6½ minutes. At no time during frying did any substantial ballooning of the cut sides of the potato pieces occur.

We claim:
1. A method for the preparation of a potato product comprising the steps of:
   (a) cutting an unpeeled potato into wedge-shaped pieces having a substantially triangular cross-section, the base of which is a section of the exterior surface of said potato having the peel retained thereon and the sides of which have no peel thereon;
   (b) cooking said pieces;
   (c) parfrying said pieces of step (b);
   (d) freezing said pieces of step (c); and
   (e) packaging said pieces of step (d);
wherein said pieces have the peel retained on said base throughout steps (a) through (e).

2. The method of claim 1 further comprising precooking and cooling said pieces prior to cooking.

3. The method of claim 1 further comprising immersing said pieces in a sugar solution prior to parfrying.

4. The method of claim 1 further comprising drying said pieces, whereby surface moisture is removed, prior to parfrying.

5. The method of claim 1 wherein said pieces are cooked in water having a temperature within the range of about 150° F.–210° F. for between about 5–40 minutes and are parfried at a temperature above about 325° F. for between about 35–150 seconds.

6. The method of claim 2 wherein said pieces are precooked in water at a temperature within the range of about 150° F.–210° F. for about 5–20 minutes and are cooled with water at a temperature within the range of about 35° F.–100° F. for about 5–20 minutes.

7. The method of claim 3 wherein said sugar solution has a temperature within the range of about 150° F.–175° F. and said pieces are immersed therein for about 2–3 minutes.

8. The method of claim 4 wherein said pieces are dried by being subjected to hot air at a temperature within the range of 150° F.–250° F. for about 5–15 minutes.

9. The method of claim 1 further comprising preparing said packaged pieces, having the peel on the base thereof, for consumption by finish frying whereby the sides of said pieces having no peel thereon do not become substantially distorted by ballooning.

10. The method of claim 1 wherein said unpeeled potato is cut into pieces the cross sections of which, taken transversely at about the midpoint of the potato piece, have a C/P ratio of less than about 3.5 where P is the width of the base at said cross section and C is the sum of the widths of the cut sides not having peel thereon at said cross section.

11. The method of claim 10 wherein said potato is cut longitudinally into said pieces.

12. The method of claim 1 wherein said potato is cut into between 4–10 pieces.

13. The method of claim 1 wherein said potato has a major diameter within the range of about 1½–2½ inches.

14. The method for the preparation of french fries having the peel retained on one side thereof comprising the steps of:
  (a) cutting unpeeled potatoes into wedge-shaped pieces having a substantially triangular cross-section, the base of which is a section of the exterior surface of the potato having the peel retained thereon and the sides of which have no peel thereon, the cross section of said pieces, when taken transversely at about the midpoint thereof, has a C/P ratio of less than about 3.5 where P is the width of the unpeeled base at said cross section and C is the sum of the widths of the sides, not having peel thereon, at said cross section;
  (b) precooking said pieces in water having a temperature in the range of about 150° F.–210° F. for about 5–20 minutes;
  (c) cooling said pieces with water having a temperature within the range of about 35° F.–100° F. for about 5–20 minutes.
  (d) cooking said pieces in water having a temperature within the range of about 150° F.–210° F. for about 5–20 minutes.
  (e) parfrying said pieces at a temperature above about 325° F. for about 35–150 seconds;
  (f) freezing said pieces at a temperature below about −10° F.; and then
  (g) preparing said pieces of step (f) for consumption; whereby each of said pieces has the peel retained on the base throughout steps (a) through (g).

15. The method of claim 14 wherein said potato is cut longitudinally into said pieces.

16. The method of claim 14 wherein said pieces are prepared for consumption by finish frying at a temperature above 325° F. for about 1½–4 minutes whereby the sides of said pieces having no peel thereon do not become substantially distorted by ballooning.

* * * * *